United States Patent
Chan et al.

(10) Patent No.: US 10,380,146 B2
(45) Date of Patent: Aug. 13, 2019

(54) LOCALE OF INTEREST IDENTIFICATION

(71) Applicant: Oath Inc., New York, NY (US)

(72) Inventors: Christopher Chan, Santa Clara, CA (US); Yu-Chin Tai, Sunnyvale, CA (US); Sameer Vasnt Shah, Sunnyvale, CA (US); Jeehaeng Lee, San Jose, CA (US); Kuo-Hsien Hsu, Cupertino, CA (US); Katrina Kimball Clark Tempero, San Mateo, CA (US); Xingjian Zhang, Sunnyvale, CA (US)

(73) Assignee: Oath Inc., New York, NY (US)

( * ) Notice: Subject to any disclaimer, the term of this patent is extended or adjusted under 35 U.S.C. 154(b) by 972 days.

(21) Appl. No.: 14/827,592

(22) Filed: Aug. 17, 2015

(65) Prior Publication Data

US 2017/0053022 A1 Feb. 23, 2017

(51) Int. Cl.
*G06F 16/29* (2019.01)
*G06F 16/9535* (2019.01)

(52) U.S. Cl.
CPC .......... *G06F 16/29* (2019.01); *G06F 16/9535* (2019.01)

(58) Field of Classification Search
USPC ................................................. 707/731, 722
See application file for complete search history.

(56) References Cited

U.S. PATENT DOCUMENTS

| | | | | |
|---|---|---|---|---|
| 8,732,101 | B1 * | 5/2014 | Wilson | G06N 3/063 706/15 |
| 9,141,988 | B2 * | 9/2015 | Howard | G06F 17/30657 |
| 9,146,129 | B1 * | 9/2015 | Furio | G01C 21/3682 |
| 9,373,131 | B1 * | 6/2016 | Hosny | G06F 17/30528 |
| 9,734,251 | B2 * | 8/2017 | Kasperski | G06F 17/3087 |
| 9,820,094 | B2 * | 11/2017 | Zhang | H04W 4/021 |
| 9,892,190 | B1 * | 2/2018 | Kirazci | H05K 999/99 |
| 2006/0173841 | A1 * | 8/2006 | Bill | G01C 21/3407 |
| 2008/0132251 | A1 * | 6/2008 | Altman | G06Q 30/0207 455/457 |
| 2009/0216577 | A1 * | 8/2009 | Killebrew | G06Q 30/02 705/7.32 |
| 2009/0265388 | A1 * | 10/2009 | Xiao | G06F 17/30241 |
| 2010/0211575 | A1 * | 8/2010 | Collins | G06F 17/30044 707/749 |
| 2011/0307478 | A1 * | 12/2011 | Pinckney | G06N 99/005 707/724 |
| 2012/0323909 | A1 * | 12/2012 | Behforooz | G06Q 50/01 707/728 |

(Continued)

*Primary Examiner* — Cam Linh T Nguyen
(74) *Attorney, Agent, or Firm* — Cooper Legal Group, LLC

(57) ABSTRACT

As provided herein, a list of locales of interest in a location may be sorted into one or more categories. A user performing a search for a locale of interest (e.g., a restaurant) may be identified. A local score may be assigned to the locale of interest based upon a number of local users (e.g., users residing in the location) that perform the search. A second user may be determined to be near the locale of interest. A category of interest may be determined for the second user (e.g., an interest in local non-tourist restaurants). Responsive to the category of interest corresponding to the category and the local score of the locale of interest exceeding an interest threshold, the second user may be provided with a recommendation to go to the locale of interest. The locale of interest may be a local favorite restaurant rather than a tourist trap.

20 Claims, 10 Drawing Sheets

(56) References Cited

U.S. PATENT DOCUMENTS

| | | | |
|---|---|---|---|
| 2013/0185355 A1* | 7/2013 | Tseng | H04W 4/21 709/204 |
| 2013/0337838 A1* | 12/2013 | Kolodziej | G06F 17/3087 455/456.3 |
| 2014/0052542 A1* | 2/2014 | Zhang | G06Q 30/0269 705/14.66 |
| 2014/0052683 A1* | 2/2014 | Kirkham | G06Q 30/0631 706/46 |
| 2014/0164511 A1* | 6/2014 | Williams | H04L 67/306 709/204 |
| 2014/0207748 A1* | 7/2014 | Sood | G06F 17/3097 707/706 |
| 2014/0258281 A1* | 9/2014 | Chen | G06Q 10/10 707/724 |
| 2014/0279196 A1* | 9/2014 | Wilson | G06Q 30/0631 705/26.7 |
| 2014/0280060 A1* | 9/2014 | Campbell | G06F 17/3087 707/722 |
| 2014/0310281 A1* | 10/2014 | Somekh | G06F 17/30312 707/737 |
| 2015/0045068 A1* | 2/2015 | Soffer | G01C 21/20 455/456.3 |
| 2015/0172328 A1* | 6/2015 | Haugen | H04L 67/22 715/753 |
| 2015/0324356 A1* | 11/2015 | Andres Gutierrez | H04N 21/436 707/734 |
| 2016/0061617 A1* | 3/2016 | Duggan | G06F 16/248 701/538 |
| 2016/0191639 A1* | 6/2016 | Dai | G06Q 30/0255 709/204 |
| 2016/0253327 A1* | 9/2016 | Zhu | G06Q 30/0278 707/725 |
| 2017/0048664 A1* | 2/2017 | Zhang | H04W 4/021 |
| 2017/0154116 A1* | 6/2017 | Zhou | G06Q 50/01 |

\* cited by examiner

LOCALE OF INTEREST IDENTIFICATION

BACKGROUND

When traveling to a new location, a user may desire to find interesting locales to visit (e.g., restaurants, bars, parks, museums, etc.). The user may search for the interesting locales and be directed toward tourist themed locales. Tourist themed locales may be expensive and may not provide the user with an experience that is authentic to the new location (e.g., the tourist themed locales may not be representative of the new location). Unfortunately, the user may be unable to locate an interesting locale that is representative of the new location, such as a local dive bar or a local favorite restaurant that serves authentic local dishes.

SUMMARY

In accordance with the present disclosure, one or more systems and/or methods of identifying a locale of interest are provided. In an example, a list of locales of interest may be generated for a location (e.g., a district, a township, a city, a state, a country, etc.). The list of locales of interest may be sorted into one or more categories (e.g., a restaurant category, a bar category, an amusement park category, a park category, a museum category, a stadium category, etc.). A user may perform a search, on a client device, for the locale of interest that is sorted into a category (e.g., an art shop category).

Responsive to determining that the user resides in the location, the user may be identified as a local user. The local user may be identified by identifying a user internet protocol (IP) address, identifying residence information about the user from a user profile of the user, utilizing geo-location software to determine that the user has been present in the location for a duration exceeding a threshold duration, etc. A local score may be assigned to the locale of interest based upon a number of local users that perform the search.

A second user, of a second client device, may be determined to be within a threshold distance of the locale of interest. The threshold distance may be identified by identifying a mode of transportation of the second user (e.g., walking, utilizing public transportation, utilizing a personal vehicle, etc.) based upon a walkability score of the location, a transportation score of the location, a traffic score of the location, etc. The second user may be determined to be within the threshold distance based upon the mode of transportation and a distance and/or travel time from a current location of the second user to the locale of interest.

A category of interest may be determined for the second user based upon one or more factors (e.g., a current weather condition, a forecasted weather condition, a current season, a message topic of a message such as an email about an art project, a user interest specified within a user profile of the second user such as having an art degree, a previously visited location by the second user such as art galleries visited by the second user, a calendar entry of a calendar such as an art show entry, a social network post such as "I cannot wait to see what the local art is like while on vacation", a time of day, national origin of the second user, a residence of the second user, etc.). A local score may be determined by weighting the local score to generate a weighted local score. The weighted local score may be determined by assigning a higher score to searches performed temporally closer to a current time relative to searches performed temporally further from the current time. Responsive to the category of interest corresponding to the category (e.g., the second user has an interest in art shops) and the local score of the locale of interest exceeding an interest threshold (e.g., local residents find the art shop interesting as opposed to merely touristy), the second user may be provided with a recommendation to go to the locale of interest (e.g., in a newsfeed, an application, a notification, a website, a map application, a mobile alert, etc.). In an example, coupons, user reviews, directions, advertisements, and/or other information about the locale of interest or similar locales of interest may be provided to the second user.

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

1. Computing Scenario

The following provides a discussion of some types of computing scenarios in which the disclosed subject matter may be utilized and/or implemented.

1.1. Networking

Figure 1:
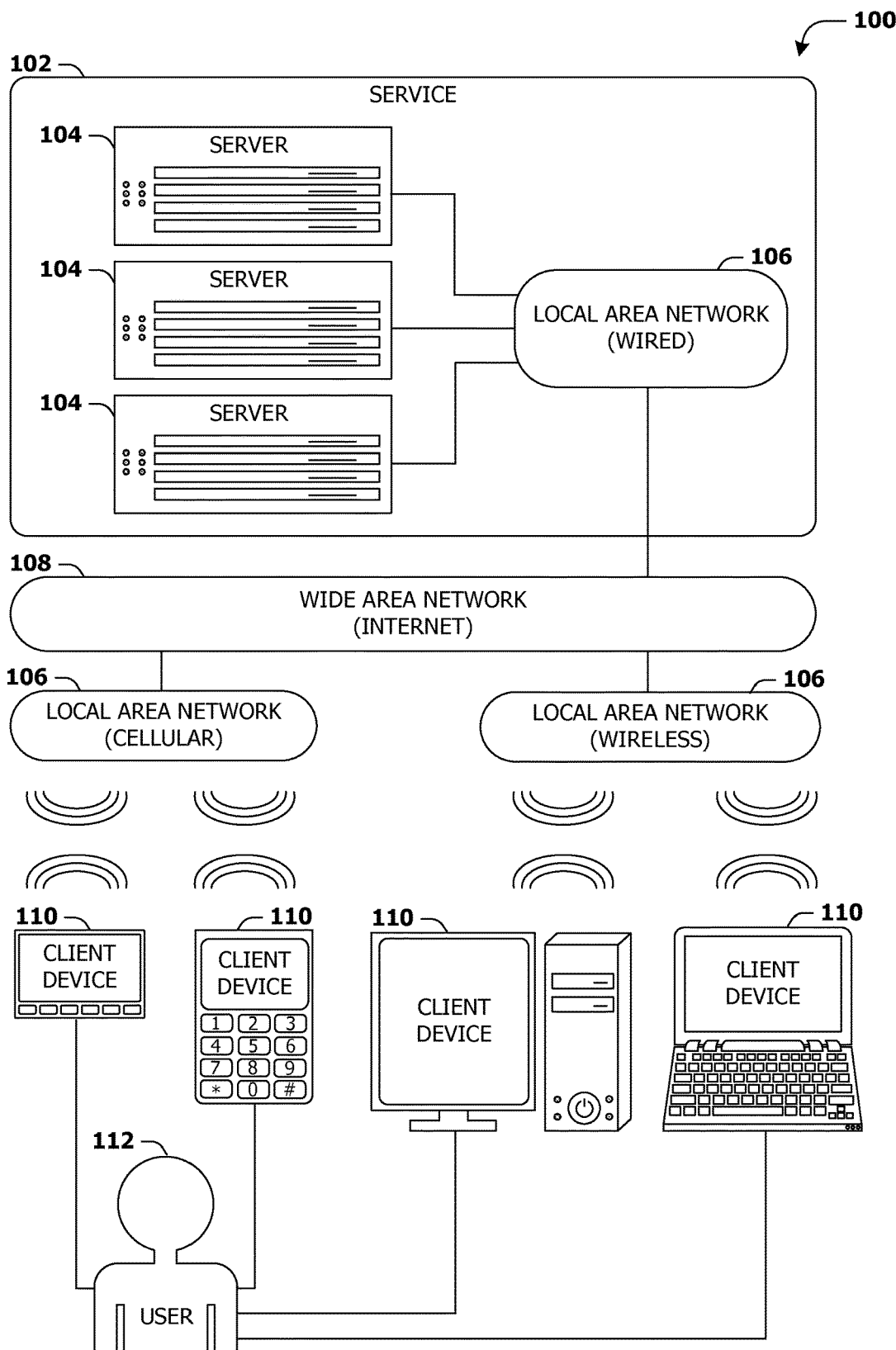
FIG. 1 is an illustration of a scenario involving various examples of networks that may connect servers and clients.

FIG. 1 is an interaction diagram of a scenario 100 illustrating a service 102 provided by a set of servers 104 to a set of client devices 110 via various types of networks. The servers 104 and/or client devices 110 may be capable of transmitting, receiving, processing, and/or storing many types of signals, such as in memory as physical memory states.

The servers 104 of the service 102 may be internally connected via a local area network 106 (LAN), such as a wired network where network adapters on the respective servers 104 are interconnected via cables (e.g., coaxial and/or fiber optic cabling), and may be connected in various topologies (e.g., buses, token rings, meshes, and/or trees). The servers 104 may be interconnected directly, or through one or more other networking devices, such as routers, switches, and/or repeaters. The servers 104 may utilize a variety of physical networking protocols (e.g., Ethernet and/or Fibre Channel) and/or logical networking protocols (e.g., variants of an Internet Protocol (IP), a Transmission Control Protocol (TCP), and/or a User Datagram Protocol (UDP). The local area network 106 may include, e.g., analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. The local area network 106 may be organized according to one or more network architectures, such as server/client, peer-to-peer, and/or mesh architectures, and/or a variety of roles, such as administrative servers, authentication servers, security monitor servers, data stores for objects such as files and databases, business logic servers, time synchronization servers, and/or front-end servers providing a user-facing interface for the service 102.

Likewise, the local area network 106 may comprise one or more sub-networks, such as may employ differing architectures, may be compliant or compatible with differing protocols and/or may interoperate within the local area network 106. Additionally, a variety of local area networks 106 may be interconnected; e.g., a router may provide a link between otherwise separate and independent local area networks 106.

In the scenario 100 of FIG. 1, the local area network 106 of the service 102 is connected to a wide area network 108 (WAN) that allows the service 102 to exchange data with other services 102 and/or client devices 110. The wide area network 108 may encompass various combinations of devices with varying levels of distribution and exposure, such as a public wide-area network (e.g., the Internet) and/or a private network (e.g., a virtual private network (VPN) of a distributed enterprise).

In the scenario 100 of FIG. 1, the service 102 may be accessed via the wide area network 108 by a user 112 of one or more client devices 110, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 110 may communicate with the service 102 via various connections to the wide area network 108. As a first such example, one or more client devices 110 may comprise a cellular communicator and may communicate with the service 102 by connecting to the wide area network 108 via a wireless local area network 106 provided by a cellular provider. As a second such example, one or more client devices 110 may communicate with the service 102 by connecting to the wide area network 108 via a wireless local area network 106 provided by a location such as the user's home or workplace (e.g., a WiFi network or a Bluetooth personal area network). In this manner, the servers 104 and the client devices 110 may communicate over various types of networks. Other types of networks that may be accessed by the servers 104 and/or client devices 110 include mass storage, such as network attached storage (NAS), a storage area network (SAN), or other forms of computer or machine readable media.

1.2. Server Configuration

Figure 2:
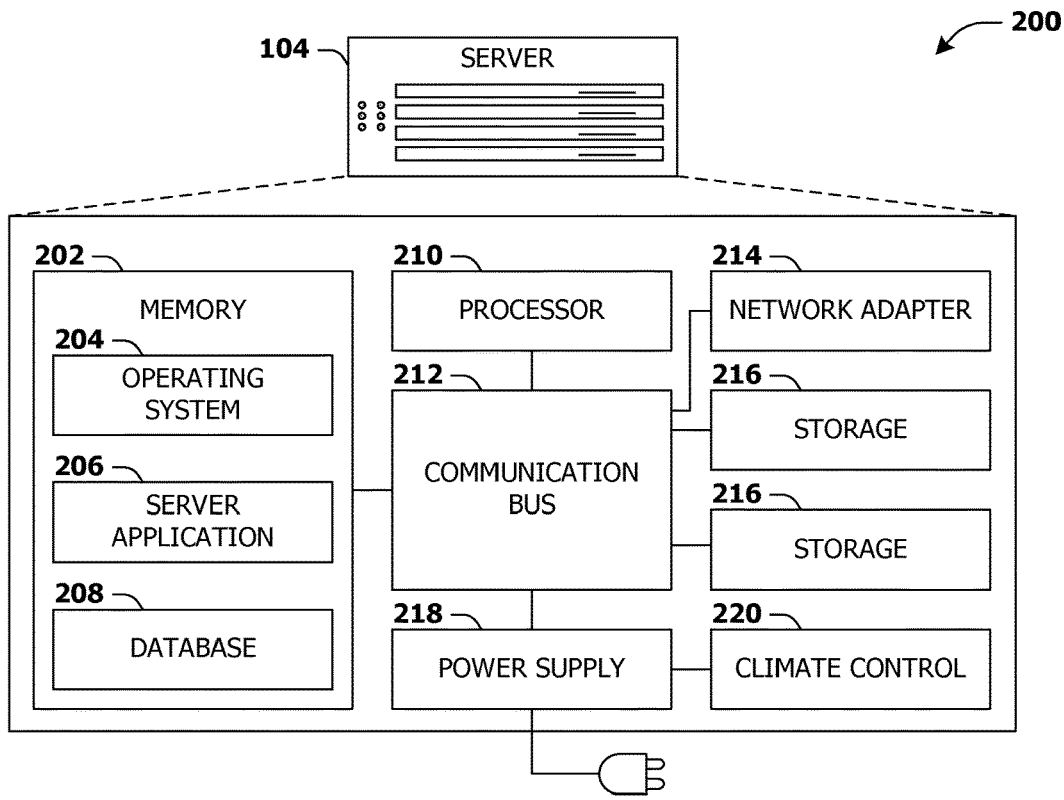
FIG. 2 is an illustration of a scenario involving an example configuration of a server that may utilize and/or implement at least a portion of the techniques presented herein.

FIG. 2 presents a schematic architecture diagram 200 of a server 104 that may utilize at least a portion of the techniques provided herein. Such a server 104 may vary widely in configuration or capabilities, alone or in conjunction with other servers, in order to provide a service such as the service 102.

The server 104 may comprise one or more processors 210 that process instructions. The one or more processors 210 may optionally include a plurality of cores; one or more coprocessors, such as a mathematics coprocessor or an integrated graphical processing unit (GPU); and/or one or more layers of local cache memory. The server 104 may comprise memory 202 storing various forms of applications, such as an operating system 204; one or more server applications 206, such as a hypertext transport protocol (HTTP) server, a file transfer protocol (FTP) server, or a simple mail transport protocol (SMTP) server; and/or various forms of data, such as a database 208 or a file system. The server 104 may comprise a variety of peripheral components, such as a wired and/or wireless network adapter 214 connectible to a local area network and/or wide area network; one or more storage components 216, such as a hard disk drive, a solid-state storage device (SSD), a flash memory device, and/or a magnetic and/or optical disk reader.

The server 104 may comprise a mainboard featuring one or more communication buses 212 that interconnect the processor 210, the memory 202, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 212 may interconnect the server 104 with at least one other server. Other components that may optionally be included with the server 104 (though not shown in the schematic diagram 200 of FIG. 2) include a display; a display adapter, such as a graphical processing unit (GPU); input peripherals, such as a keyboard and/or mouse; and a flash memory device that may store a basic input/output system (BIOS) routine that facilitates booting the server 104 to a state of readiness.

The server 104 may operate in various physical enclosures, such as a desktop or tower, and/or may be integrated with a display as an "all-in-one" device. The server 104 may be mounted horizontally and/or in a cabinet or rack, and/or may simply comprise an interconnected set of components. The server 104 may comprise a dedicated and/or shared power supply 218 that supplies and/or regulates power for the other components. The server 104 may provide power to and/or receive power from another server and/or other devices. The server 104 may comprise a shared and/or dedicated climate control unit 220 that regulates climate properties, such as temperature, humidity, and/or airflow. Many such servers 104 may be configured and/or adapted to utilize at least a portion of the techniques presented herein.

1.3. Client Device Configuration

Figure 3:
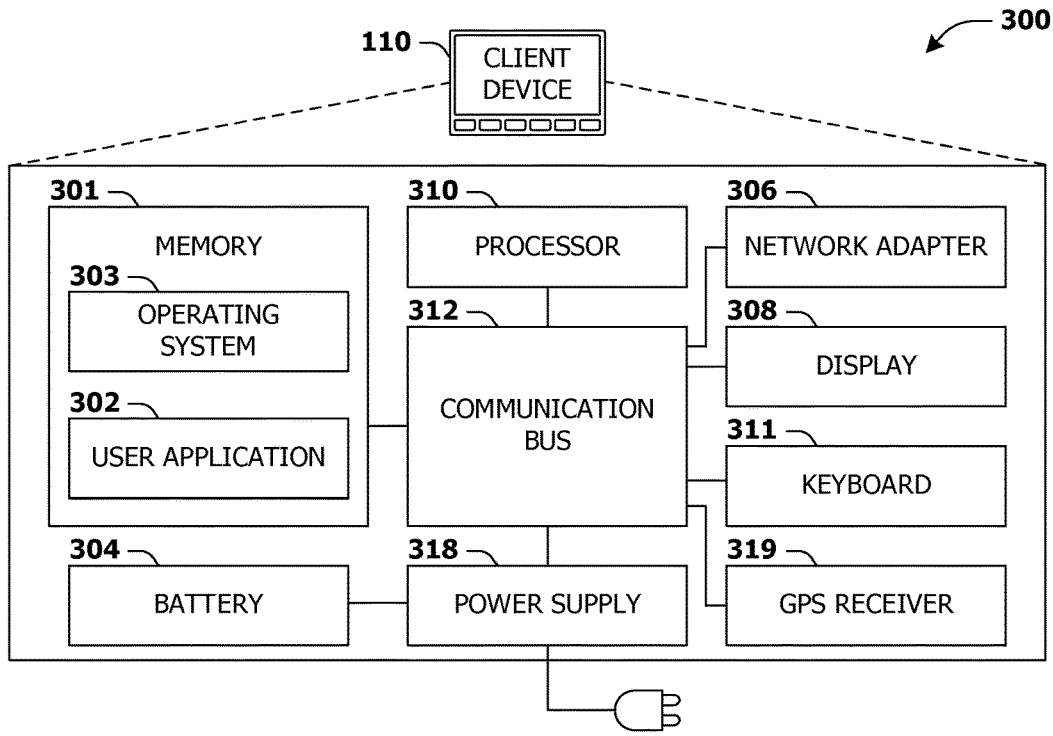
FIG. 3 is an illustration of a scenario involving an example configuration of a client that may utilize and/or implement at least a portion of the techniques presented herein.

FIG. 3 presents a schematic architecture diagram 300 of a client device 110 whereupon at least a portion of the techniques presented herein may be implemented. Such a client device 110 may vary widely in configuration or capabilities, in order to provide a variety of functionality to a user such as the user 112. The client device 110 may be provided in a variety of form factors, such as a desktop or tower workstation; an "all-in-one" device integrated with a display 308; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 110 may serve the user in a variety of roles, such as a workstation, kiosk, media player, gaming device, and/or appliance.

The client device 110 may comprise one or more processors 310 that process instructions. The one or more processors 310 may optionally include a plurality of cores; one or more coprocessors, such as a mathematics coprocessor or an integrated graphical processing unit (GPU); and/or one or more layers of local cache memory. The client device 110 may comprise memory 301 storing various forms of applications, such as an operating system 303; one or more user applications 302, such as document applications, media applications, file and/or data access applications, communication applications such as web browsers and/or email clients, utilities, and/or games; and/or drivers for various peripherals. The client device 110 may comprise a variety of peripheral components, such as a wired and/or wireless network adapter 306 connectible to a local area network and/or wide area network; one or more output components, such as a display 308 coupled with a display adapter (optionally including a graphical processing unit (GPU)), a sound adapter coupled with a speaker, and/or a printer; input devices for receiving input from the user, such as a keyboard 311, a mouse, a microphone, a camera, and/or a touch-sensitive component of the display 308; and/or environmental sensors, such as a global positioning system (GPS) receiver 319 that detects the location, velocity, and/or acceleration of the client device 110, a compass, accelerometer, and/or gyroscope that detects a physical orientation of the client device 110. Other components that may optionally be included with the client device 110 (though not shown in the schematic diagram 300 of FIG. 3) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 110 to a state of readiness; and a climate control unit that regulates climate properties, such as temperature, humidity, and airflow.

The client device 110 may comprise a mainboard featuring one or more communication buses 312 that interconnect the processor 310, the memory 301, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 110 may comprise a dedicated and/or shared power supply 318 that supplies and/or regulates power for other components, and/or a battery 304 that stores power for use while the client device 110 is not connected to a power source via the power supply 318. The client device 110 may provide power to and/or receive power from other client devices.

In some scenarios, as a user 112 interacts with a software application on a client device 110 (e.g., an instant messenger and/or electronic mail application), descriptive content in the form of signals or stored physical states within memory (e.g., an email address, instant messenger identifier, phone number, postal address, message content, date, and/or time) may be identified. Descriptive content may be stored, typically along with contextual content. For example, the source of a phone number (e.g., a communication received from another user via an instant messenger application) may be stored as contextual content associated with the phone number. Contextual content, therefore, may identify circumstances surrounding receipt of a phone number (e.g., the date or time that the phone number was received), and may be associated with descriptive content. Contextual content, may, for example, be used to subsequently search for associated descriptive content. For example, a search for phone numbers received from specific individuals, received via an instant messenger application or at a given date or time, may be initiated. The client device 110 may include one or more servers that may locally serve the client device 110 and/or other client devices of the user 112 and/or other individuals. For example, a locally installed webserver may provide web content in response to locally submitted web requests. Many such client devices 110 may be configured and/or adapted to utilize at least a portion of the techniques presented herein.

2. Presented Techniques

One or more systems and/or techniques for identifying locales of interest are provided. A local user (e.g., a user residing in a location, such as a city) may search for a locale of interest (e.g., a restaurant, a bar, an amusement park, a park, a museum, a stadium, etc.). The locale of interest may comprise a local "favorite" (e.g., a neighborhood bar that many local users frequent). A second user may travel to the location and desire to go to locales of interest that have local "flavor" rather than tourist locales of interest that are frequented by tourists. The locale of interest may be determined to be a local "favorite" based upon a threshold number of searches for the locale of interest performed by local users.

Additionally, a native user (e.g., the user that resides in a native location other than the location) may search for native locales of interest. For example, the native user, residing in Italy, may search for an Italian restaurant in the location. Based upon a number of searches for a native locale of interest performed by native users, the native locale of interest may be determined to be a native "favorite" (e.g., a great Italian restaurant in the location).

Based upon one or more factors (e.g., a current weather condition, a forecasted weather condition, a current season, a message topic of a message associated with the second user, a social network post by the second user, a calendar entry of a calendar of the second user, a previously visited location by the second user, a user interest specified within a user profile of the second user, a time of day, national origin of the second user, a residence of the second user, etc.) and a distance of the locale of interest from a current location of the user, the locale of interest may be recommended to the user. In an example, if the current time is around noon (e.g., lunch time) and the current weather condition is 78° F. and sunny, then the locale of interest may comprise a rooftop restaurant that is popular with local users. In another example, if the current time is around 7 pm (e.g., dinner time) and the second user has a stated preference for Italian food, then the native locale of interest (e.g., the Italian restaurant) may be provided to the second user. In this way, the second user may be provided with options to experience the location like the local user rather than being exposed to merely tourist locales of interest.

Figure 4A:
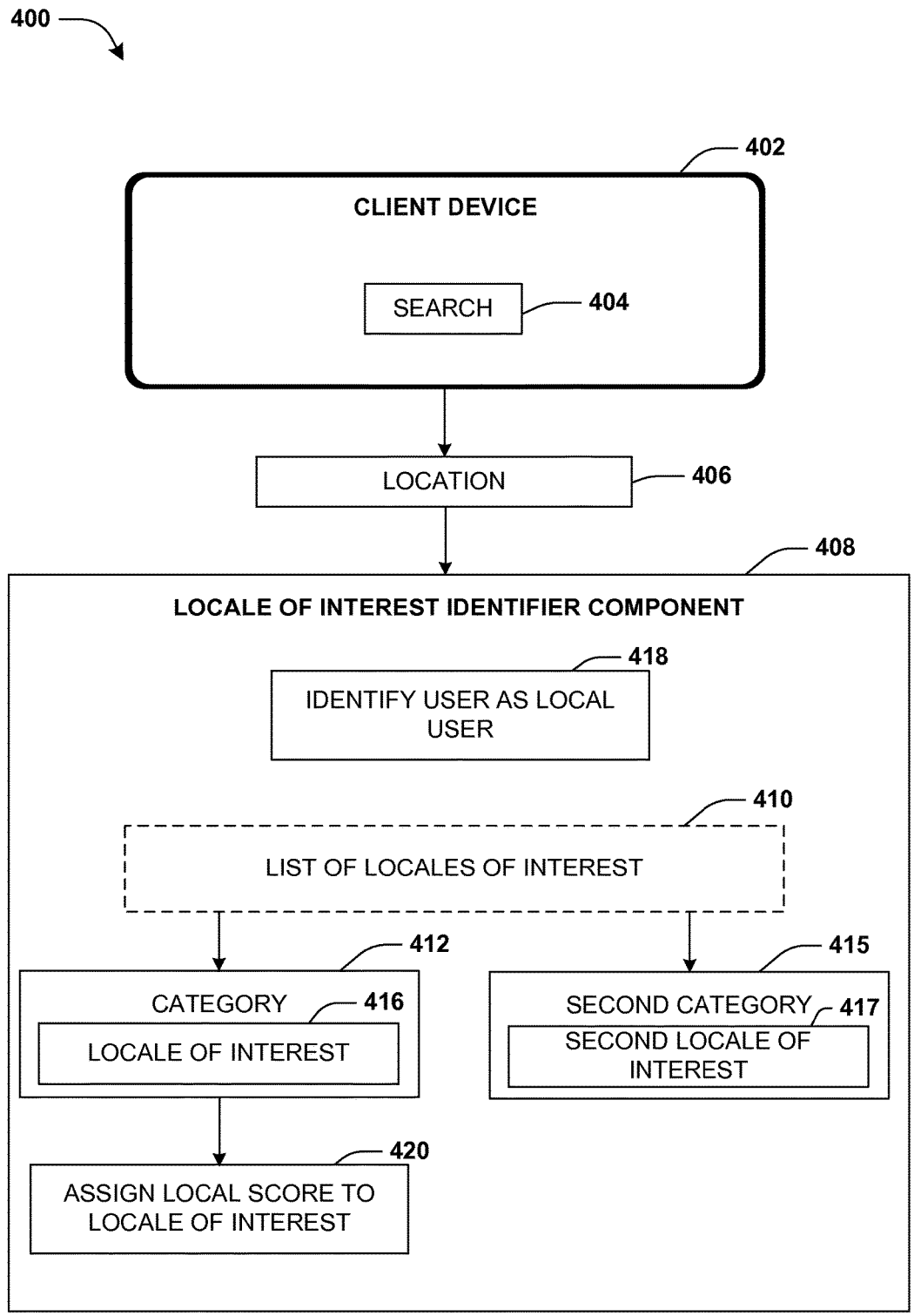
FIG. 4A is a component block diagram illustrating an example system for identification of a locale of interest, where a user is identified as a local user.
Figure 4B:
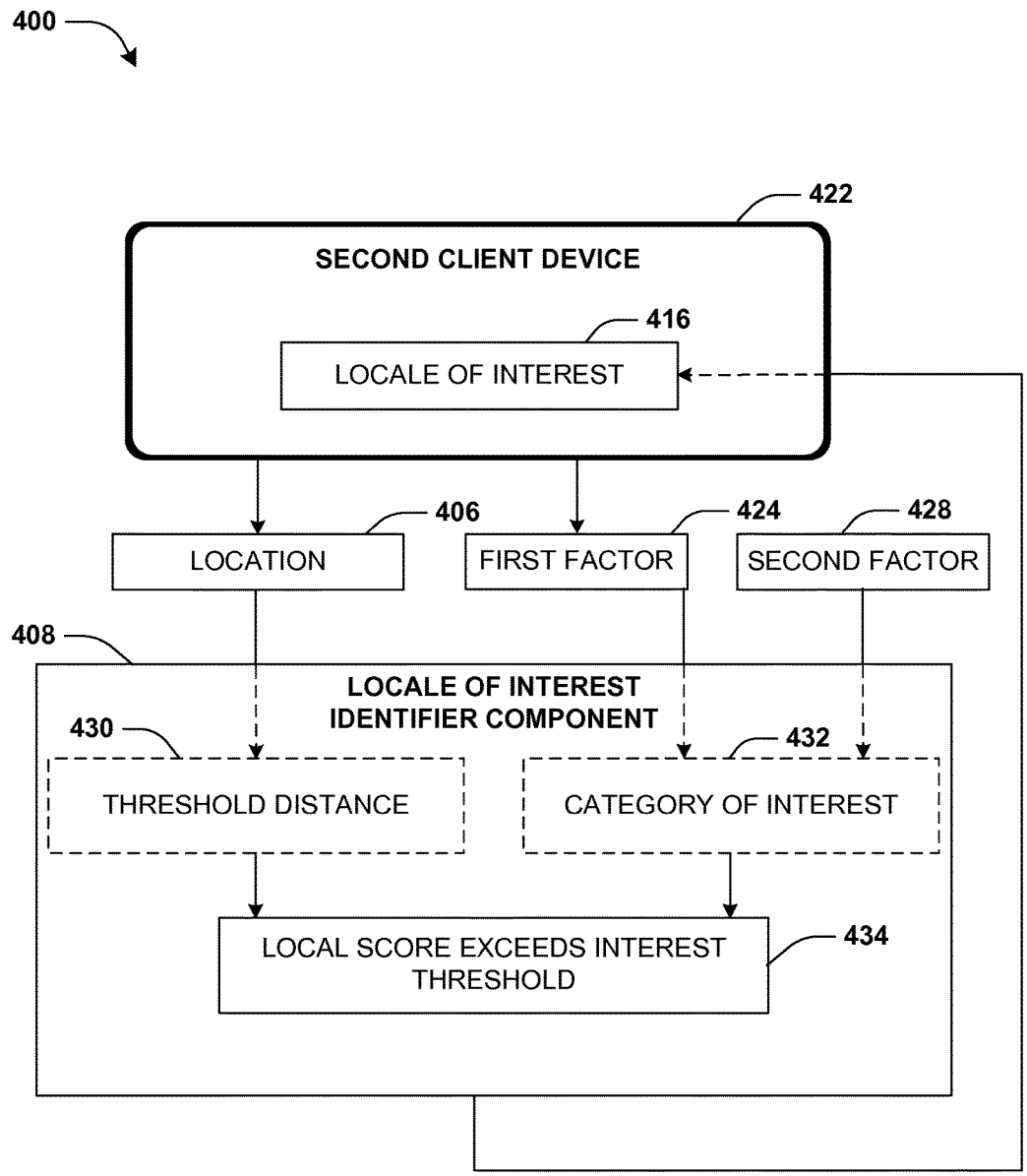
FIG. 4B is a component block diagram illustrating an example system for identification of a locale of interest, where the locale of interest is provided to a second user.

FIGS. 4A-4B illustrate an example system 400 for identifying a locale of interest 416 utilizing a locale of interest identifier component 408. A user, of a client device 402, may perform a search 404 for the locale of interest 416. The locale of interest identifier component 408 may identify a location 406 in which the user resides. The location 406 in which the user resides may be identified by identifying a user internet protocol (IP) address, identifying residence information about the user from a user profile of the user, utilizing geo-location software to determine that the user has been present in the location 406 for a duration exceeding a threshold duration (e.g., 3 months or some other time period), etc. Responsive to determining that the user resides in the location 406, the user may be identified 418 as a local user. Multiple users may be identified 418 as local users.

The locale of interest identifier component 408 may generate a list of locales of interest 410. The locale of interest identifier component 408 may sort the locales of interest in the list of locales of interest 410 into categories (e.g., a restaurant category, a bar category, an amusement park category, a retail store category, an event category, a business category, a park category, a museum category, a stadium category, etc.). In an example, a restaurant may be sorted into the restaurant category, however based upon the restaurant having a bar, the restaurant may also be sorted into the bar category. The locale of interest identifier component 408 may sort locales of interest into sub-categories, such as restaurants that are open for lunch, brunch, etc., restaurants that have outdoor seating, a type of food the restaurant serves (e.g., Italian, Spanish, Sushi, fusion, etc.), etc. In an example, the locale of interest 416 (e.g., an Italian restaurant) may be sorted into a category 412 (e.g., the restaurant category) and a second locale of interest 417 (e.g., a park) may be sorted into a second category 415 (e.g., the park category).

The locale of interest identifier component 408 may assign 420 a local score to the locale of interest 416. The local score may be based upon a number of searches performed for the locale of interest 416 by the local users. The local score may be weighted to comprise a weighted local score. In an example, the local score may be weighted by assigning a higher score responsive to the local user posting a positive review of the locale of interest 416 compared to the local user merely performing the search; the local user indicating that the local user is going to the locale of interest 416 (e.g., making a reservation at the Italian restaurant) compared to the local user merely performing the search; etc. In an example, the local score may be weighted by assigning a higher score to searches performed temporally closer to a current time as compared to searches performed temporally further away from the current time.

FIG. 4B illustrates the locale of interest 416 being provided to a second user. The second user, of a second client device 422, may travel to the location 406. In an example, multiple second users may travel to the location 406. The locale of interest identifier component 408 may determine that the second user is present at the location 406 based upon global position system (GPS) data from the second client device 422, an IF address of the second user, etc. The locale of interest identifier component 408 may identify the locale of interest 416 as being within a threshold distance 430 of a current location of the second user (e.g., a hotel where the second user is residing, a conference the second user is attending, etc.). The threshold distance 430 may be identified by identifying a mode of transportation of the second user (e.g., walking, utilizing public transportation, utilizing a personal vehicle, etc.) based upon the mode of transportation (e.g., a walkability score of the location, a transportation score of the location, a traffic score of the location, etc.).

The locale of interest identifier component 408 may determine a category of interest 432 of the second user based upon one or more factors. The one or more factors may comprise a current weather condition, a forecasted weather condition, a current season, a message topic of a message associated with the second user, a social network post by the second user, a calendar entry of a calendar of the second user, a previously visited location by the second user, a user interest specified within a user profile of the second user (e.g., a webmail profile, a social media profile, etc.), a time of day, national origin of the second user, residence of the second user, etc.

In an example, a first factor 424 may comprise the stated interest of the second user (e.g., the user profile comprises the statement "I love sushi"). In an example, a second factor 428 may comprise the current season (e.g., summer), and a third factor (not shown) may comprise a time of day (e.g., 11:30 AM on a Monday). Based upon the first factor 424, the second factor 428 and the third factor, the category of interest 432 may comprise the restaurant category, and sub-categories that comprise a lunch category (e.g., comprising restaurants that are open for lunch), a sushi category (e.g., comprising restaurants that serve sushi), and an outdoor category (e.g., comprising restaurants that offer outdoor seating).

In another example, the first factor 424 may comprise the current season (e.g., winter), the second factor 428 may comprise the current weather (e.g., 40° F. and cloudy), and the third factor may comprise the time of day (e.g., 9:30 PM on a Friday). Based upon the first factor 424, the second factor 428 and the third factor, the category of interest 432 may comprise the bar category and a sub-category that comprises an indoor bar category (e.g., no rooftop bars or outdoor bars because of the cold temperature).

Responsive to the category of interest 432 corresponding to the category 412, as illustrated in FIG. 4A, and the local score of the locale of interest 416 exceeding 434 an interest threshold, the locale of interest identifier component 408 may provide the locale of interest 416 to the second user and/or the multiple second users. In an example, the interest threshold may comprise a set number of searches performed for the locale of interest 416 by local users, a set weighted score, etc. In an example, the locale of interest 416 may be presented to the second user in a newsfeed, an application, application website, a map application, a mobile alert, a notification (e.g., via a text message, an internet message, a social media message, etc.).

Figure 5:
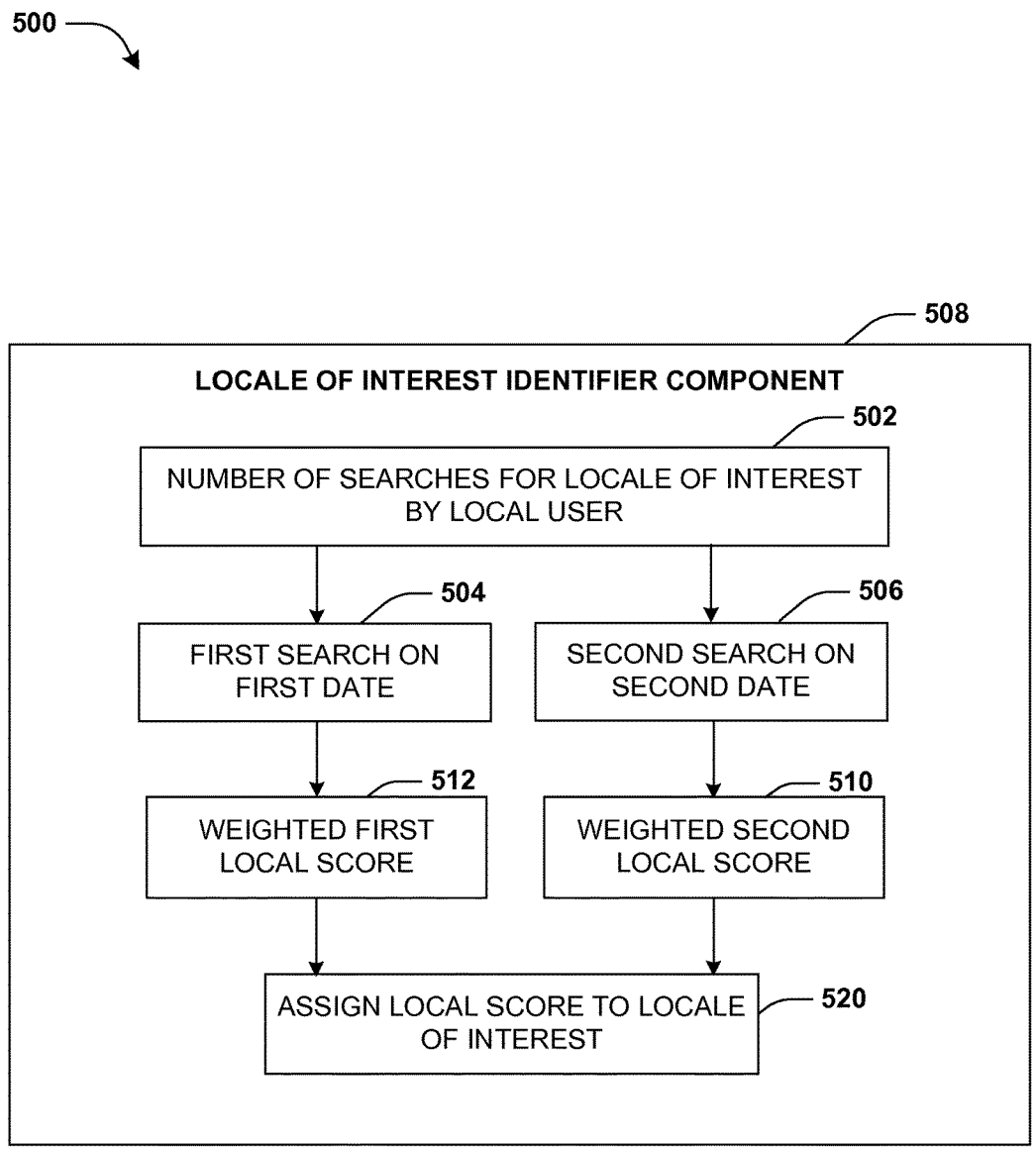
FIG. 5 is a component block diagram illustrating an example system for identifying a locale of interest, where a local score is assigned.

FIG. 5 is an illustration of a component block diagram illustrating an example system 500 for assigning 520 a local score to a locale of interest utilizing a locale of interest identifier component 508. A number of searches 502 for the locale of interest performed by local users may be identified. A first search 504 may be performed on a first date. In an example, the first search 504 may comprise a search for the locale of interest performed 2 weeks ago relative to a current date. A second search 506 may be performed on a second date. In an example, the second search 506 may comprise a search for the locale of interest performed 2 months ago relative to the current date. The first search 504 may be assigned a weighted first local score 512 and the second search 506 may be assigned a weighted second local score 510. The weighted first local score 512 may exceed the second weighted local score 510 based upon the first search 504 being performed temporally closer to the current date than the second search 506.

In another example, responsive to a peak in searches for the locale of interest (e.g., where the locale of interest comprises a new restaurant that recently opened) followed by a decline in searches for the locale of interest (e.g., where within the first month of the opening of the new restaurant, the number of searches by local users decreases from 1000 a day to 4 a day), the earlier searches may be weighted less heavily than more recent searches (e.g., based upon the new restaurant generating the peak in searches because the new restaurant was new rather than being a favorite of the local users). The locale of interest identifier component 508 may assign 520 the local score to the locale of interest based upon the weighted first local score, the weighted second local score, and/or other weighted local scores.

Figure 6:
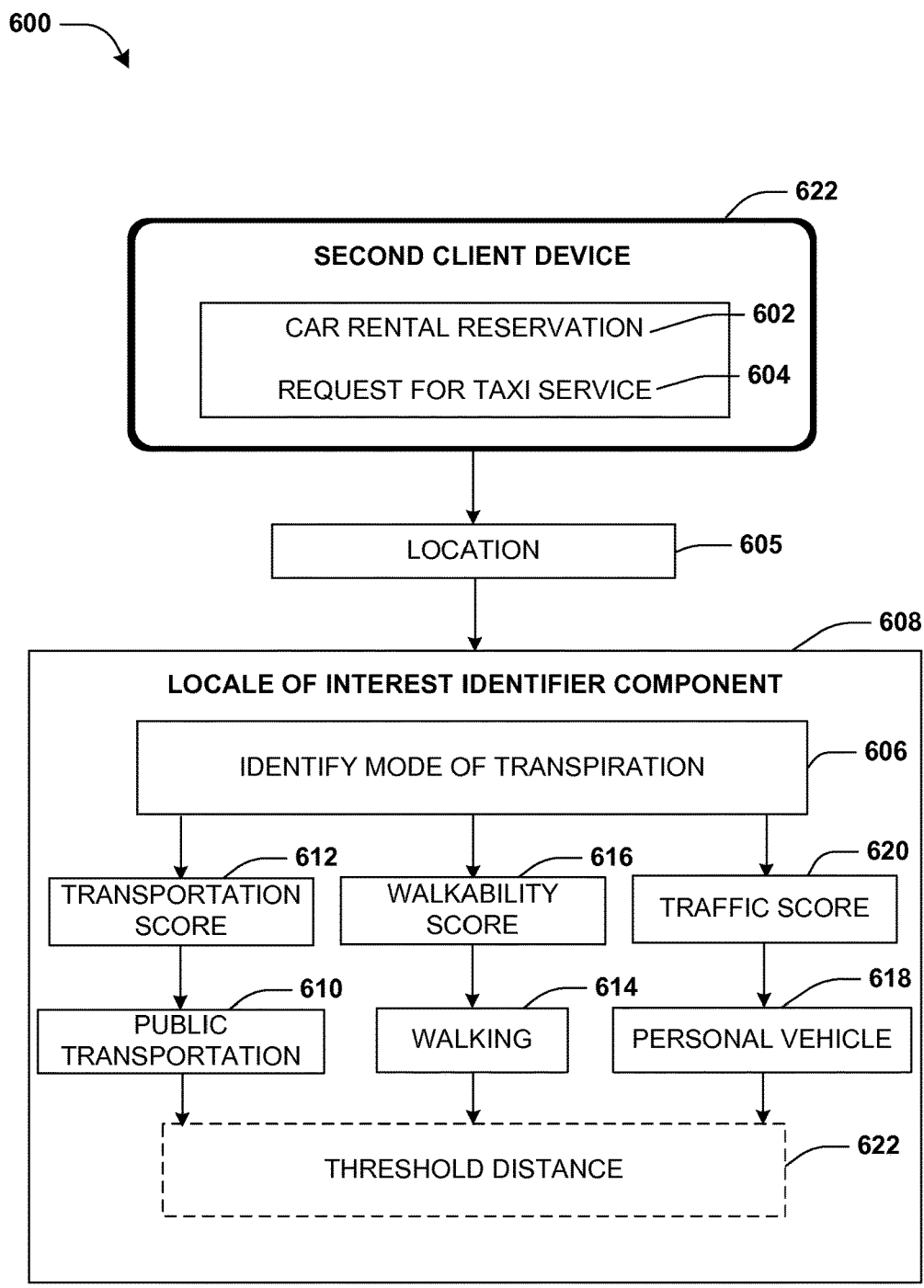
FIG. 6 is a component block diagram illustrating an example system for identification of a locale of interest, where a mode of transportation of a second user is identified.

FIG. 6 illustrates a component block diagram illustrating an example system 600 for identifying 606 a mode of transportation for a second user at a location 605 utilizing a locale of interest identifier component 608. The second user, of a second client device 622, may travel to the location 605. In an example, the locale of interest identifier component 608 may identify 606 walking 614 as the mode of transportation based upon a walkability score 616. The walkability score 616 may be based upon availability of parking, density of traffic, and/or a percentage of local users that utilize walking to travel within the location 605. Thus, relatively closer locales of interest, within walking distance of the second user, may be identified.

In another example where the second user has a car rental reservation 602, the locale of interest identifier component 608 may identify 606 utilizing a personal vehicle 618 as the mode of transportation based upon a traffic score 620. The traffic score 620 may be based upon a traffic density of the location 605, a relative distance of locales of interest from each other (e.g., based upon the locales of interest being separated by a mile or more, a decreased likelihood that the second user may walk), etc. Thus, locales of interest, within driving distance of the second user, may be identified.

In another example, the locale of interest identifier component 608 may identify 606 utilization of public transportation 610 as the mode of transportation based upon a transportation score 612. The transportation score 612 may be based upon an availability of public transportation (e.g., buses, trains, subways, metros, taxi cabs, etc.) in the location 605. In another example, responsive to the second user submitting a request for a taxi service 604, the locale of interest identifier component 608 may identify 606 utilizing public transportation 610 as the mode of transportation. Thus, locales of interest, such as restaurants near bus stations or within close driving distance to reduce taxi fare costs, may be identified.

The locale of interest identifier component 608 may determine a threshold distance 622 from a current location of the second user and the locale of interest based on the mode of transportation. The locale of interest identifier component 608 may incorporate a time of day, traffic patterns, etc. into the determination of the threshold distance 622. In an example, if the mode of transportation comprises walking 614, then the threshold distance may be a walk-able distance (e.g., 0 miles-2 miles). In an example, if the mode of transportation comprises utilizing the personal vehicle 618, then the threshold distance may comprise a drivable distance (e.g., 1 mile to about 20 miles). The drivable distance may be determined by estimating a driving time based upon current travel conditions (e.g., current weather, accidents along a route to the locale of interest, traffic along the route, etc.). In an example, based upon the drivable distance comprising 5 miles, the drivable distance may be considered below the threshold distance 622, however, if the drive time is 30 minutes, then the drivable distance may exceed the threshold distance 622.

In an example, if the mode of transportation comprises utilizing the public transportation 610, then the threshold distance may comprise a transportable distance (e.g., 1 mile to about 15 miles) or distances within walking of public transportation hubs such as bus stops. The transportable distance may be determined by estimating a transport time based upon estimated travel times for the public transportation 612. In an example, based upon the transportable distance comprising 9 miles, the transportable distance may be considered below the threshold distance 622, however, if the transport time is 50 minutes, then the transportable distance may exceed the threshold distance 622.

Figure 7A:
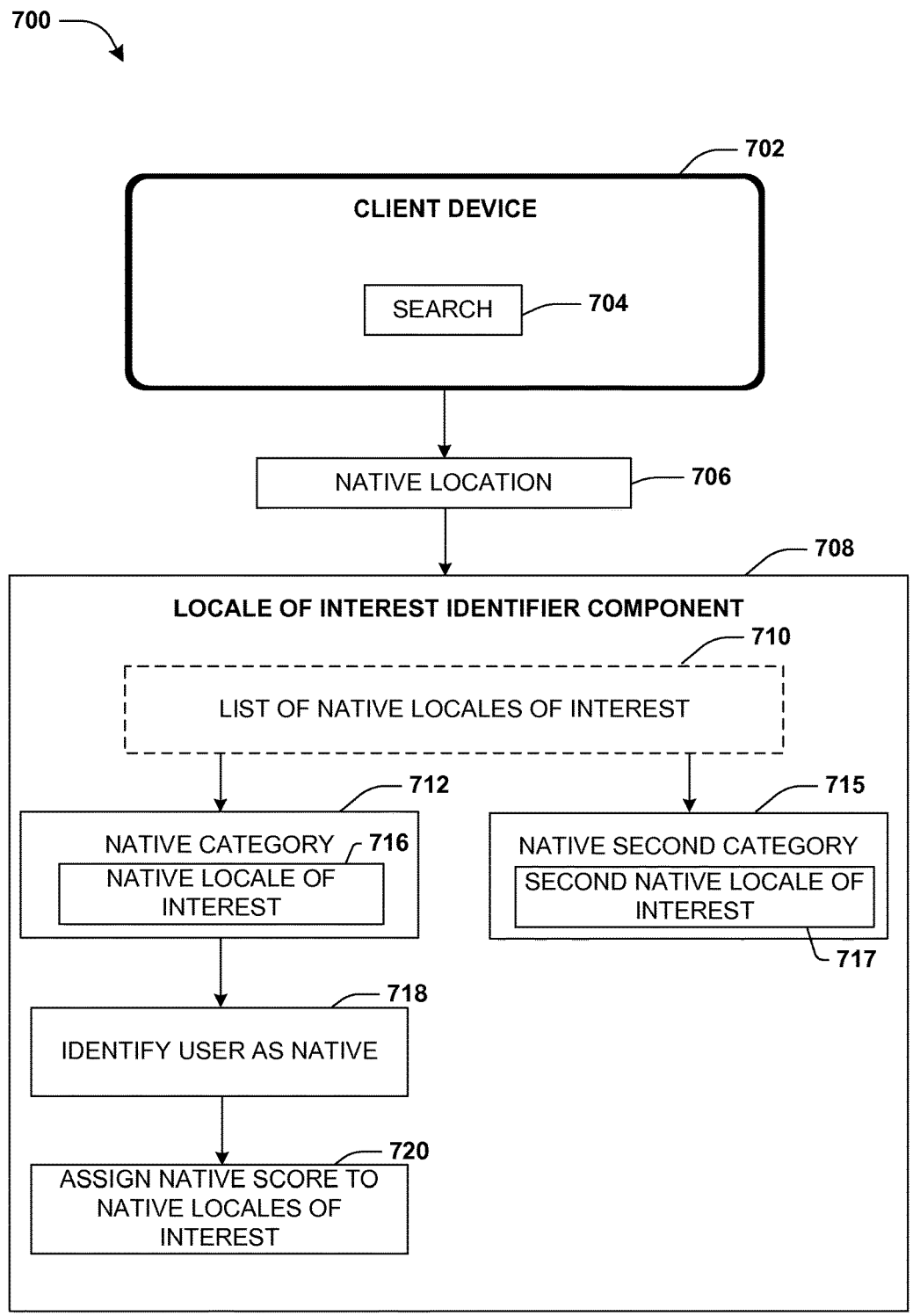
FIG. 7A is a component block diagram illustrating an example system for identification of a native locale of interest, where a user is identified as a native user.
Figure 7B:
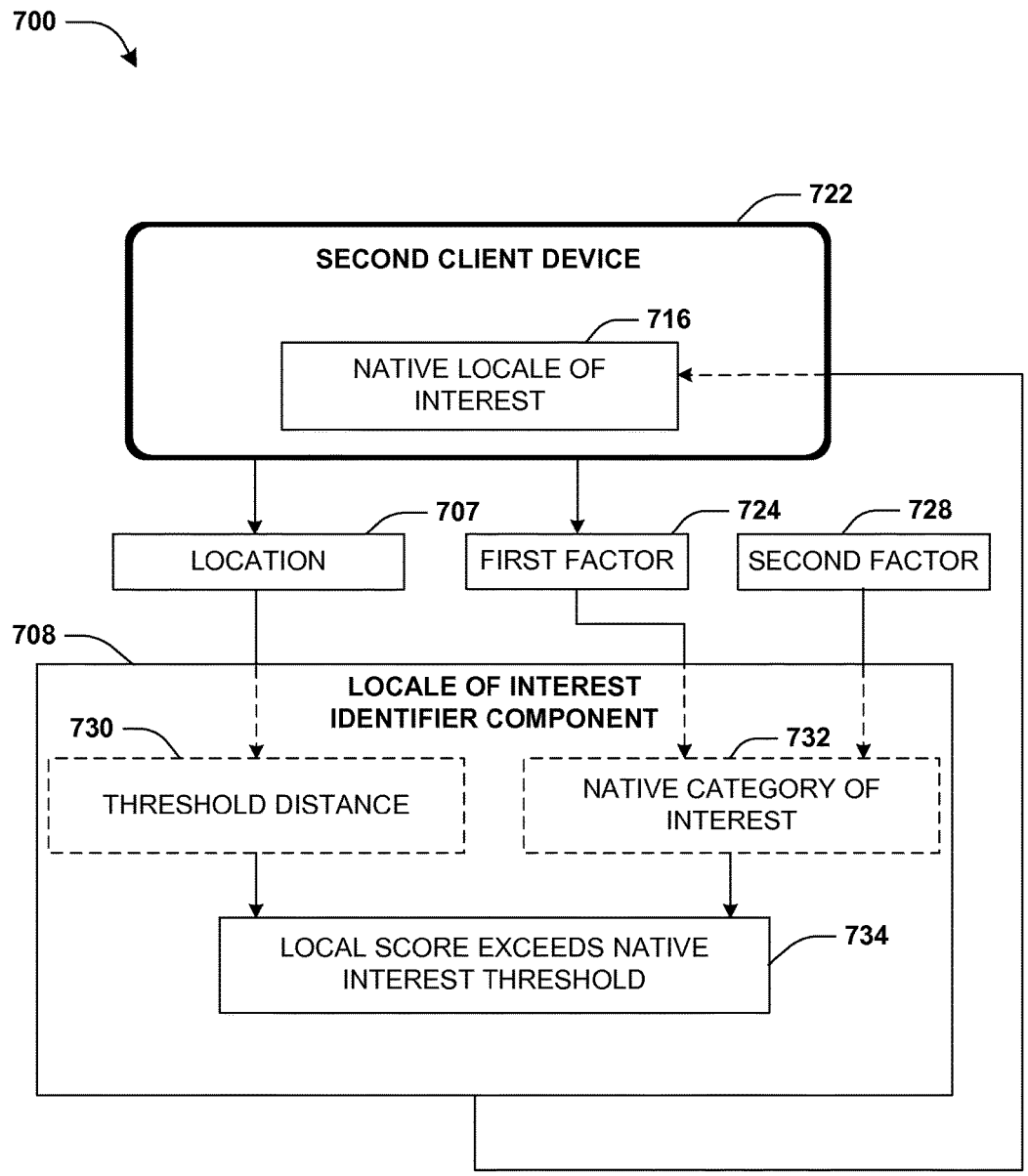
FIG. 7B is a component block diagram illustrating an example system for identification of a native locale of interest, where the native locale of interest is provided to a second user.

FIGS. 7A-7B illustrate a component block diagram illustrating an example system 700 for identifying a native locale of interest 716 utilizing a locale of interest identifier component 708. A user, of a client device 702, may perform a search 704 for the native locale of interest 716 in a location 707. The native locale of interest 716 may comprise a restaurant having a native theme (e.g., the restaurant may serve Italian food, Japanese food, Chinese food, German food, etc.), a bar having the native theme, etc. in the location 707. The locale of interest identifier component 708 may identify a native location 706 in which the user resides. In an example, if the native user resides in France, then the native locale of interest 716 may comprise a French restaurant. Responsive to determining that the user resides in the native location 706, the user may be identified 718 as a native user.

The locale of interest identifier component 708 may generate a list of native locales of interest 710 (e.g., from a list of locales of interest located in the location 707). The locale of interest identifier component 708 may sort native locales of interest, from the list of native locales of interest 710, into categories. In an example, the categories may comprise a restaurant category, a bar category, a native category 714 (e.g., German), a second native category 715 (e.g., Mexican), an amusement park category, a park category, a retail store category, an event category, a business category, a museum category, a stadium category etc. In another example, the native locale of interest 716 (e.g., a Mexican restaurant) may be sorted into the native category 712 (e.g., a Mexican restaurant category) and a second native locale of interest 717 (e.g., a Vietnamese restaurant) may be sorted into the second native category 715 (e.g., a Vietnamese restaurant category). The locale of interest identifier component 708 may assign 720 a native score to the native locale of interest 716. The native score may be based upon a number of searches performed for the native locale of interest 716 by native users. For example, the native score may be based upon the number of searches performed by the native users (e.g., users that reside in Germany) for a German restaurant in the location 707. The native score may be weighted to comprise a weighted native score.

FIG. 7B illustrates the native locale of interest 716 being provided to a second user. The second user, of a second client device 722, may travel to the location 707. The locale of interest identifier component 708 may identify the native locale of interest 716 as being within a threshold distance 730 of a current location of the second user. The locale of interest identifier component 708 may determine a native category of interest 732 of the second user based upon one or more factors. The one or more factors may comprise a current weather condition, a forecasted weather condition, a current season, the second user performing one or more past searches for native locales of interest (e.g., searches for Mexican food, Mexican drinks, etc.), a stated interest of the second user (e.g., on a user profile of the second user), a national origin of the second user, a residency of the second user, a social network profile specify a native interest, or a message topic corresponding to the native interest, etc. In an example, a first factor 724 may comprise the stated interest of the second user (e.g., the user profile may comprise the statement "I love tacos"). In an example, a second factor 728 may comprise the second user's nationality (e.g., Mexican). Based upon the first factor 724 and/or the second factor 728, the category of interest 732 may comprise the Mexican restaurant category.

Responsive to the native category of interest 732 corresponding to the native category 712 and the native score of the native locale of interest 716 exceeding 734 a native interest threshold, the locale of interest identifier component 708 may provide the native locale of interest 716 to the second user. In an example, the native interest threshold may comprise a set number of searches performed for the native locale of interest 716 by native users.

In another example, the user may be determined to reside in a second location (e.g., the user does not reside in the location 707). Responsive to determining that the user resides in the second location, the user may be identified as a tourist user. A tourist score may be assigned to the locale of interest based upon a number of tourist users that perform the search. The second user may be determined to have an interest in tourist attractions based upon one of the one or more factors. Responsive to the category of interest corresponding to a tourist category and the tourist score of the locale of interest exceeding a tourist interest threshold, the second user may be provided with the recommendation to go to the locale of interest.

Figure 8:
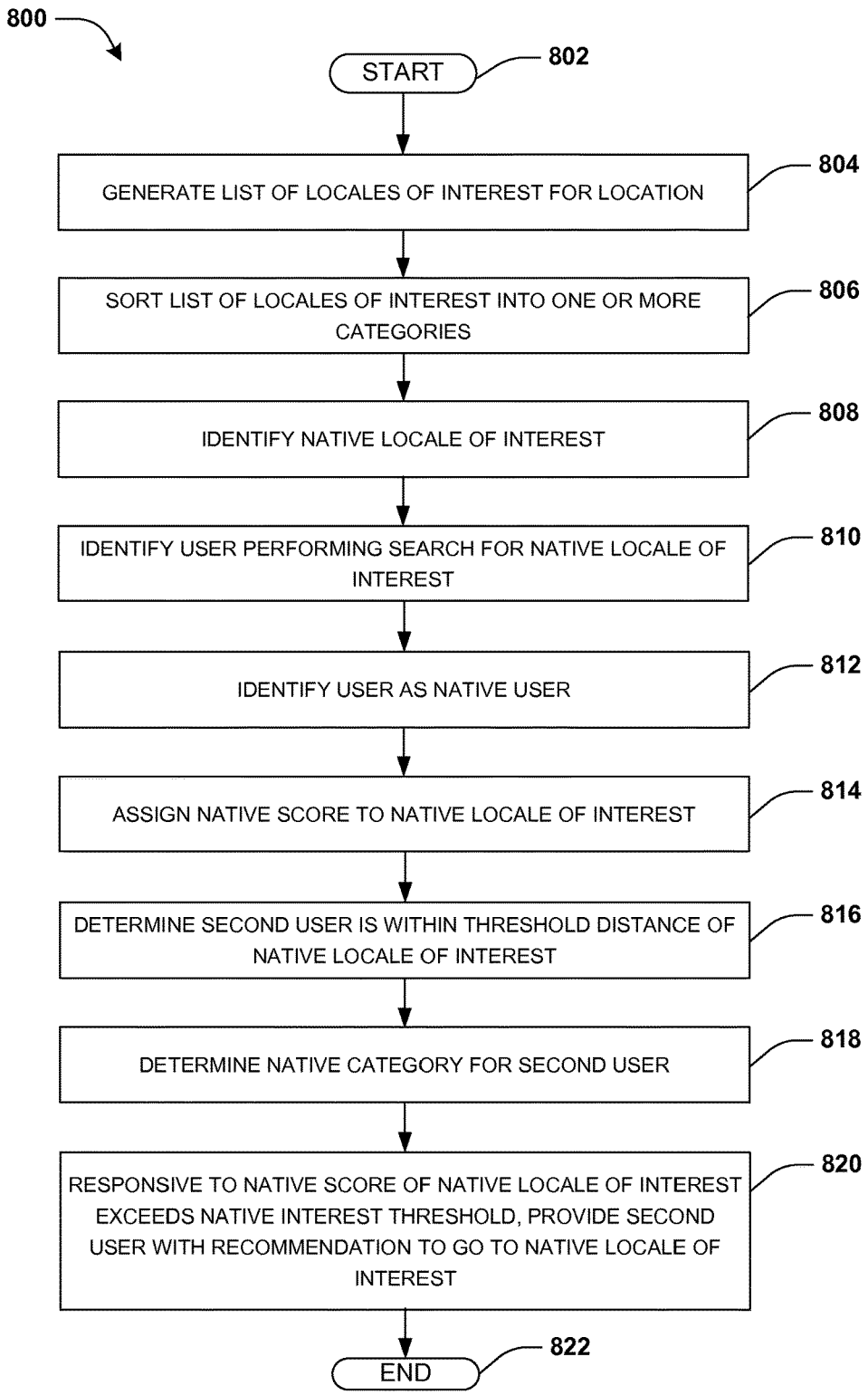
FIG. 8 is a flow chart illustrating an example method identifying a native locale of interest.

An embodiment of identifying a locale of interest is illustrated by an example method 800 of FIG. 8. At 802, the method 800 starts. At 804, a list of locales of interest may be generated for a location. At 806, the list of locales of interest may be sorted into one or more categories. At 808, a native locale of interest may be identified, within the list of locales of interest, as having a native category. At 810, a user performing a search, on a client device, for the native locale may be identified. At 812, responsive to determining the user resides in a native location, the user may be identified as a native user. For example, the native user may reside in the native location corresponding to the native location of interest (e.g., if the native user resides in Chile, then the native locale of interest may comprise a Chilean themed bar). At 814, a native score may be assigned to the native locale of interest based upon a number of native users that perform the search. At 816, a second user of a second client device may be determined to be within a threshold distance of the native locale of interest. At 818, a native category of interest, corresponding to the native category, may be determined for the second user based upon one or more factors. At 820, responsive to the native score of the native locale of interest exceeding a native interest threshold, the second user may be provided with a recommendation to go to the native locale of interest. At 822, the method 800 ends.

Figure 9:
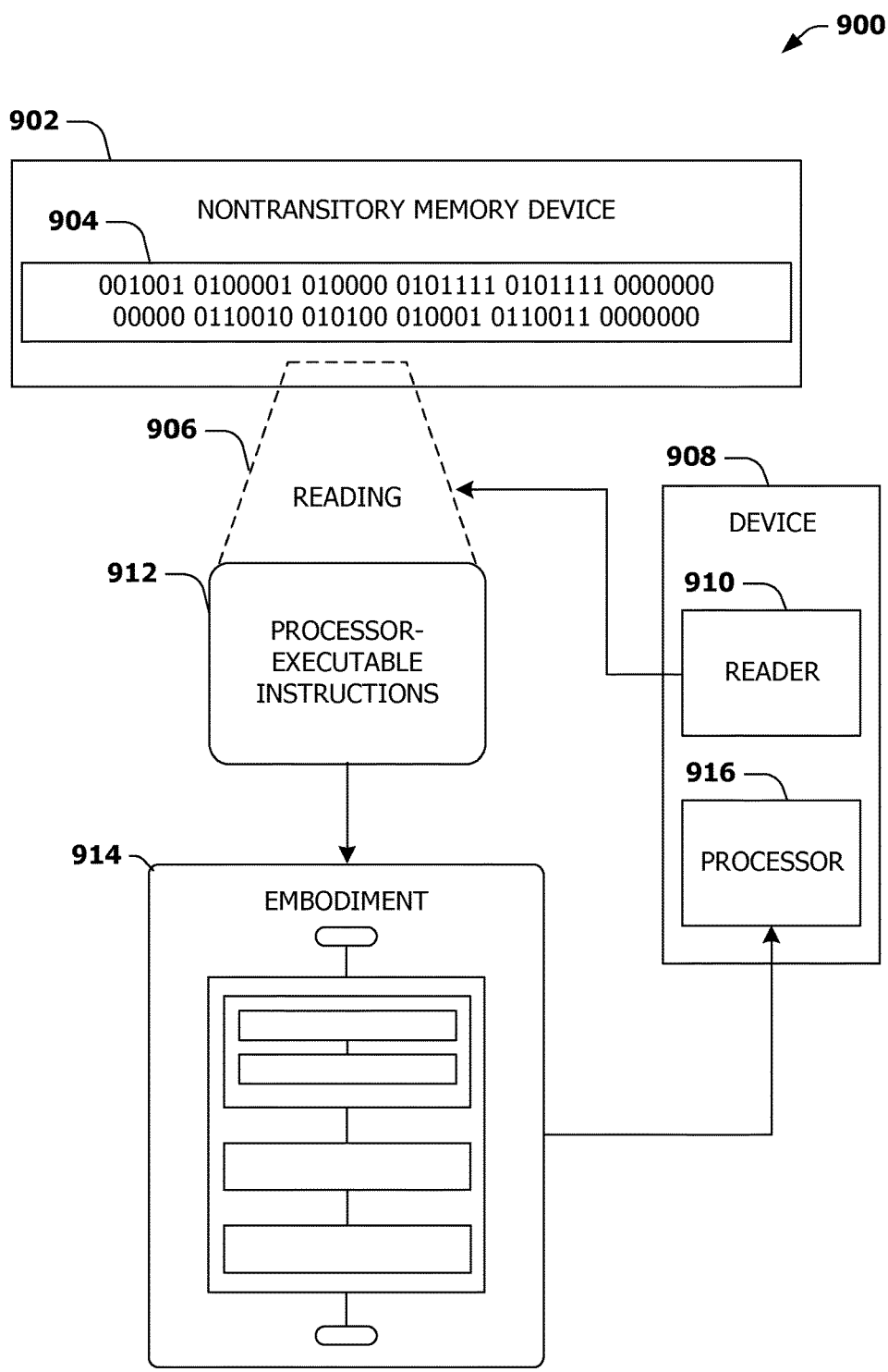
FIG. 9 is an illustration of a scenario featuring an example nontransitory memory device in accordance with one or more of the provisions set forth herein.

FIG. 9 is an illustration of a scenario 900 involving an example nontransitory memory device 902. The nontransitory memory device 902 may comprise instructions that when executed perform at least some of the provisions herein. The nontransitory memory device may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a CD, DVD, or floppy disk). The example nontransitory memory device 902 stores computer-readable data 904 that, when subjected to reading 906 by a reader 910 of a device 908 (e.g., a read head of a hard disk drive, or a read operation invoked on a solid-state storage device), express processor-executable instructions 912. In some embodiments, the processor-executable instructions, when executed on a processor 916 of the device 908, are configured to perform a method, such as at least some of the example method 800 of FIG. 8, for example. In some embodiments, the processor-executable instructions, when executed on the processor 916 of the device 908, are configured to implement a system, such as at least at least some of the example system 400 of FIGS. 4A-4B, at least some of the example system 500 of FIG. 5, at least some of the example system 600 of FIG. 6, and/or at least some of the example system 700 of FIGS. 7A-7B, for example.

3. Usage of Terms

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", with, and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A system for identifying a locale of interest, comprising:
   a processor; and
   memory comprising processor-executable instructions that, when executed by the processor, implement a locale of interest identifier component configured to:
      generate a list of locales of interest for a location;
      sort the list of locales of interest into one or more categories;
      identify a user performing a search, on a client device, for a locale of interest sorted into a category;
      responsive to determining that the user resides in the location, identify the user as a local user;
      assign a local score to the locale of interest based upon a number of local users that perform the search, wherein the assigning comprises assigning a higher score to one or more searches performed temporally closer to a current time relative to one or more searches performed temporally further away from the current time such that a first instance of the search for the locale of interest that is performed by a first user at a first time is assigned a first score and a second instance of the search for the locale of interest that is performed by another user at a second time is assigned a second score greater than the first score based upon the current time being temporally closer to the second time at which the second instance of the search is performed than the first time at which the first instance of the search is performed;
      determine that a second user of a second client device is within a threshold distance of the locale of interest;
      determine a category of interest for the second user based upon one or more factors; and
      responsive to (i) the category of interest corresponding to the category and (ii) the local score of the locale of interest, corresponding to the number of local users that perform the search, exceeding a native interest threshold corresponding to a threshold number of searches performed by local users, provide the second user with a recommendation to go to the locale of interest.

2. The system of claim 1, the location comprising at least one of a district, a township, a city, a state, or a country.

3. The system of claim 1, the one or more categories comprising at least one of:
   a restaurant category, a bar category, an amusement park category, a park category, a museum category, a retail store category, an event category, a business category, or a stadium category.

4. The system of claim 1, the locale of interest identifier component configured to determine that the user resides in the location by at least one of:
   identifying a user internet protocol (IP) address;
   identifying residence information about the user from a user profile of the user; or
   utilizing geo-location software to determine that the user has been present in the location for a duration exceeding a threshold duration.

5. The system of claim 1, the one or more factors comprising at least one of:
   a current weather condition, a forecasted weather condition, a current season, a message topic of a message associated with the second user, a social network post by the second user, a calendar entry of a calendar of the second user, a previously visited location by the second user, a user interest specified within a user profile of the second user, a time of day, national origin of the second user, a residence of the second user.

6. The system of claim 1, the locale of interest identifier component configured to assign the local score based upon:
   weighting the local score to generate a weighted local score.

7. The system of claim 1, wherein the assigning the local score to the locale of interest is performed at a third time, the locale of interest identifier component configured to:
   assign, at a fourth time after the third time, a second local score to the locale of interest based upon a second number of local users that perform the search, wherein the second local score of the locale of interest is different than the local score of the locale of interest.

8. The system of claim 1, the locale of interest identifier component configured to determine the threshold distance based upon:
identifying a mode of transportation of the second user, the mode of transportation comprising at least one of walking, utilizing public transportation, or utilizing a personal vehicle.

9. The system of claim 1, the locale of interest identifier component configured to determine the threshold distance based upon at least one of:
a walkability score of the location, a transportation score of the location, or a traffic score of the location.

10. The system of claim 1, the locale of interest identifier component configured to provide the second user with the recommendation by:
providing the second user with the recommendation in at least one of a newsfeed, an application, a notification, a message, a website, a map application, or a mobile device alert.

11. The system of claim 1, the locale of interest identifier component configured to:
responsive to determining that the user resides in a second location, identify the user as a tourist user;
assign a tourist score to the locale of interest based upon a number of tourist users that perform the search;
determine that at least one of the one or more factors comprises an interest in tourist attractions; and
responsive to the category of interest corresponding to the category and the tourist score of the locale of interest exceeding a tourist interest threshold, provide the second user with the recommendation to go to the locale of interest.

12. The system of claim 1, the locale of interest identifier component configured to:
identify, within the list of locales of interest, a native locale of interest having a native category;
responsive to determining that the user resides in a native location, identify the user as a native user that performed a second search for the native locale of interest;
assign a native score to the native locale of interest based upon a number of native users that perform at least one search for the native locale of interest;
determine that the second user, of the second client device, is within the threshold distance of the native locale of interest;
determine a native category of interest for the second user based upon the one or more factors; and
responsive to the native category of interest corresponding to the native category and the native score of the native locale of interest exceeding the native interest threshold, provide the second user with the recommendation to go to the native locale of interest.

13. The system of claim 12, the locale of interest identifier component configured to:
identify the native user as residing in the native location associated with the native locale of interest.

14. A method for identifying a locale of interest comprising:
generating a list of locales of interest for a location;
sorting the list of locales of interest into one or more categories;
identify, within the list of locales of interest, a native locale of interest having a native category;
identifying a user performing a search, on a client device, for the native locale of interest;
responsive to determining that the user resides in a native location, identifying the user as a native user;
assigning a native score to the native locale of interest based upon a number of native users that perform the search, wherein the assigning comprises assigning a higher score to one or more searches performed temporally closer to a current time relative to one or more searches performed temporally further away from the current time such that a first instance of the search for the native locale of interest that is performed by a first user at a first time is assigned a first score and a second instance of the search for the native locale of interest that is performed by another user at a second time is assigned a second score greater than the first score based upon the current time being temporally closer to the second time at which the second instance of the search is performed than the first time at which the first instance of the search is performed;
determining that a second user, of a second client device, is within a threshold distance of the native locale of interest;
determining a native category of interest for the second user based upon one or more factors; and
responsive to the native score of the native locale of interest, corresponding to the number of native users that perform the search, exceeding a native interest threshold corresponding to a threshold number of searches performed by native users, provide the second user with a recommendation to go to the native locale of interest.

15. The method of claim 14, comprising:
identifying the native user as residing in the native location associated with the native locale of interest.

16. The method of claim 14, the location comprising at least one of a district, a township, a city, a state, or a country.

17. The method of claim 14, the one or more categories comprising at least one of:
a restaurant category, a bar category, an amusement park category, a park category, a retail store category, an event category, a business category, a museum category, or a stadium category.

18. The method of claim 14, the determining the native category of interest for the second user comprising:
determining the native category of interest based upon at least one of:
the second user performing one or more past searches for native locales of interest, a national origin of the second user or a residency of the second user.

19. The method of claim 14, the determining the native category of interest for the second user comprising:
determining the native category of interest based upon at least one of:
a social network profile specifying a native interest or a message topic corresponding to the native interest.

20. A system for identifying a locale of interest comprising:
a processor; and
memory comprising processor-executable instructions that, when executed by the processor, implement a locale of interest identifier component configured to:
generate a list of locales of interest for a location;
sort the list of locales of interest into one or more categories;
identify a user performing a search, on a client device, for a locale of interest sorted into a category;
responsive to determining that the user resides in the location, identify the user as a local user;
assign a local score to the locale of interest based upon a number of local users that perform the search, wherein the assigning comprises assigning a higher score to one or more searches performed temporally closer to a current time relative to one or more searches performed temporally further away from the current time such that a first instance of the search for the locale of interest that is performed by a first user at a first time is assigned a first score and a second instance of the search for the locale of interest that is performed by another user at a second time is assigned a second score greater than the first score based upon the current time being temporally closer to the second time at which the second instance of the search is performed than the first time at which the first instance of the search is performed;

determine that a second user, of a second client device, is within a threshold distance of the locale of interest;

determine a category of interest for the second user based upon one or more factors, the one or more factors comprising at least one of a current weather condition, a forecasted weather condition, a current season, national origin of the second user, residence of the second user, a message topic of a message associated with the second user, a social network post by the second user, a calendar entry of a calendar of the second user, a previously visited location by the second user, a user interest specified within a user profile of the second user, or a time of day; and responsive to the category of interest corresponding to the category and the local score of the locale of interest exceeding an interest threshold, provide the second user with a recommendation to go to the locale of interest.

\* \* \* \* \*

UNITED STATES PATENT AND TRADEMARK OFFICE
CERTIFICATE OF CORRECTION

PATENT NO. : 10,380,146 B2
APPLICATION NO. : 14/827592
DATED : August 13, 2019
INVENTOR(S) : Christopher Chan et al.

It is certified that error appears in the above-identified patent and that said Letters Patent is hereby corrected as shown below:

On the Title Page

Item (72) Inventors: Delete "Sameer Vasnt Shah" and insert therefor --Sameer Vasant Shah--

Signed and Sealed this
Fourteenth Day of January, 2020

Andrei Iancu
*Director of the United States Patent and Trademark Office*